United States Patent
Judge et al.

(10) Patent No.: US 10,230,849 B1
(45) Date of Patent: Mar. 12, 2019

(54) INTELLIGENT MEDIA RELAY SELECTION

(71) Applicant: 8x8, Inc., San Jose, CA (US)

(72) Inventors: Garth Judge, San Jose, CA (US); Huw Rees, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 298 days.

(21) Appl. No.: 15/285,613

(22) Filed: Oct. 5, 2016

Related U.S. Application Data

(63) Continuation of application No. 14/843,806, filed on Sep. 2, 2015, now Pat. No. 9,479,648, which is a continuation of application No. 13/732,605, filed on Jan. 2, 2013, now Pat. No. 9,148,519.

(51) Int. Cl.
*H04M 7/00* (2006.01)
*H04L 12/733* (2013.01)

(52) U.S. Cl.
CPC ........ *H04M 7/0075* (2013.01); *H04L 45/122* (2013.01); *H04M 7/0072* (2013.01)

(58) Field of Classification Search
CPC .. H04M 7/0075; H04M 7/0072; H04L 45/122
See application file for complete search history.

(56) References Cited

U.S. PATENT DOCUMENTS

| | | |
|---|---|---|
| 7,224,774 B1 | 5/2007 | Brown et al. |
| 7,826,602 B1 | 11/2010 | Hunyady et al. |
| 8,228,861 B1 | 7/2012 | Nix |
| 8,606,884 B2 | 12/2013 | Kim |
| 9,148,519 B1 | 9/2015 | Judge et al. |
| 2003/0058839 A1 | 3/2003 | D'Souza |
| 2004/0005886 A1 | 1/2004 | Oda et al. |
| 2004/0032862 A1 | 2/2004 | Schoeneberger et al. |
| 2004/0203782 A1 | 10/2004 | Peng et al. |

(Continued)

OTHER PUBLICATIONS

International Telecommunications Union, Series P: Telephone Transmission Quality, Telephone Installations, Local Line Networks, ITU-T Recommendation P.862, "Perceptual evaluation of speech quality (PESQ): An objective method for end-to-end speech quality assessment of narrow-band telephone networks and speech codecs," Feb. 2001.

(Continued)

*Primary Examiner* — Derrick W Ferris
*Assistant Examiner* — Kevin H Lee
(74) *Attorney, Agent, or Firm* — Crawford Maunu PLLC

(57) ABSTRACT

A Voice over Internet Protocol (VoIP) apparatus or system includes a call control agent that is configured and arranged to perform a number of functions. The call control agent is configured to receive a connection request for a VoIP call and then accesses a list of media-relay servers (MRSs) that are located at geographically disparate locations relative to one another. The call control agent can execute a selection algorithm that processes variables for the MRSs in the list. In response to the selection algorithm, the call control agent is configured to select a particular MRS from the list. In response to the selection, the call control agent can then direct an endpoint to route audio media for the VoIP call through the particular MRS. The call control agent also is configured to maintain a call state for the VoIP call while the voice media is routed through the particular MRS.

15 Claims, 3 Drawing Sheets

(56) References Cited

U.S. PATENT DOCUMENTS

| | | |
|---|---|---|
| 2006/0083199 A1 | 4/2006 | Yang |
| 2006/0171298 A1* | 8/2006 | Vu .................. G06F 9/5088 370/216 |
| 2008/0019268 A1 | 1/2008 | Rollins |
| 2008/0226054 A1* | 9/2008 | Mashinsky .......... G06Q 20/367 379/210.01 |
| 2009/0287846 A1* | 11/2009 | Iyengar ............... H04L 67/1002 709/242 |
| 2010/0208707 A1 | 8/2010 | Hamabe et al. |
| 2011/0190018 A1 | 8/2011 | Love et al. |
| 2012/0042081 A1 | 2/2012 | Liao et al. |
| 2012/0281685 A1 | 11/2012 | Kotecha et al. |

OTHER PUBLICATIONS

Radvision, "Back-To-Back User Agent (B2BUA) SIP Servers Powering Next Generation Networks: A Functional and Architectural Look At Back-To-Back User Agent (B2BUA) SIP Servers," 2007.

* cited by examiner

INTELLIGENT MEDIA RELAY SELECTION

OVERVIEW

Voice over Internet Protocol (VoIP) technology allows for calls to be made using Internet connections. VoIP technology can be used in place of traditional analog/digital phone lines and can also be used to supplement traditional phone lines. Depending upon the type of VoIP service and the VoIP provider's capabilities, VoIP calls can be made between other VoIP users and/or to anyone having a telephone number (e.g., calls to local, long distance, mobile and/or international numbers). VoIP calls can be initiated and received using a general purpose computer (e.g., using software that provides a soft phone interface), specialized hardware (e.g., a VoIP telephone), or specialized interface equipment (e.g., an analog telephone adapter).

VoIP call connections can be handled using a variety of different protocols, mechanisms and systems. For example, VoIP endpoint (or user agents) devices can communicate using peer-to-peer (P2P) techniques. The media from the endpoints can be sent directly between session participants without changing the format of the audio media, or providing additional functionality (e.g., using the same transmission protocol throughout the transport/transmission path between the endpoints). Proxy servers can be used in the call routing path between endpoints by forwarding call setup and teardown controls between endpoints. As such, proxy servers are primarily passive in nature and do not change the P2P relationship between endpoint devices.

Another solution facilitates call transfers using a back-to-back user agent (B2BUA) coupled to a media-relay server (MRS). The MRS can function as an intermediary between endpoint devices. For instance, the MRS can convert received audio media so that endpoint devices using different transmission protocols can communicate. The B2BUA is closely linked with the MRS and can oversee and provide additional control and value-added features (e.g., billing, automatic call disconnection, call transfer, etc.). The B2BUA can effectively split a call into two legs by operating two independent call control protocols on each side of the communication session.

Session Initiation Protocol (SIP) is an application-layer control (signaling) protocol for creating, modifying, and terminating sessions between endpoint devices or participants. Although the sessions can be used to transmit many different types of information, particular uses include VoIP and multimedia conferences. SIP can run on top of many different transport protocols.

Aspects of the present disclosure are directed toward the use of a call control agent (e.g., a B2BUA) to select between multiple MRSs for any particular connection request. Specific embodiments allow for the B2BUA and the multiple MRSs to be separated from one another on several fronts. This can include separation by way of different physical locations, different logical locations, different protocols/capabilities and/or different management of the servers. Additional aspects are discussed in more detail herein.

SUMMARY

Embodiments are directed toward a Voice over Internet Protocol (VoIP) system that includes a call control agent (such as back-to-back user agent (B2BUA) server, an Internet Protocol-private branch exchange (IP-PBX) or a Contact Center application) that is configured and arranged to perform a number of functions. The call control agent is configured to receive a connection request for a VoIP call (the connection request including a source identifier and a destination identifier) and then accesses a list of media-relay servers (MRSs) that are located at geographically disparate locations relative to one another. The call control agent can execute a selection algorithm that processes variables for the MRSs in the list. In response to the selection algorithm, the call control agent is configured to select a particular MRS from the list. In response to the selection, the call control agent can then direct an endpoint to route audio media for the VoIP call through the particular MRS. The call control agent also is configured to maintain a call state for the VoIP call while the voice media is routed through the particular MRS.

Various embodiments are directed toward methods for use with a VoIP system. As part of the method, a call control agent receives a connection request for a VoIP call (the connection request including a source identifier and a destination identifier) and then accesses a list of MRSs that are located at geographically disparate locations relative to one another. The call control agent executes a selection algorithm that processes variables for the MRSs in the list. In response to the selection algorithm, the call control agent selects a particular MRS from the list. In response to the selection, the call control agent directs an endpoint to route audio media for the VoIP call to the particular MRS. The call control agent also maintains a call state for the VoIP call while the voice media is routed through the particular MRS.

The above summary is not intended to describe each illustrated embodiment or every implementation of the present disclosure.

BRIEF DESCRIPTION OF THE DRAWINGS

The disclosure may be more completely understood in consideration of the following detailed description of various embodiments of the disclosure in connection with the accompanying drawings, in which.

Figure 1:
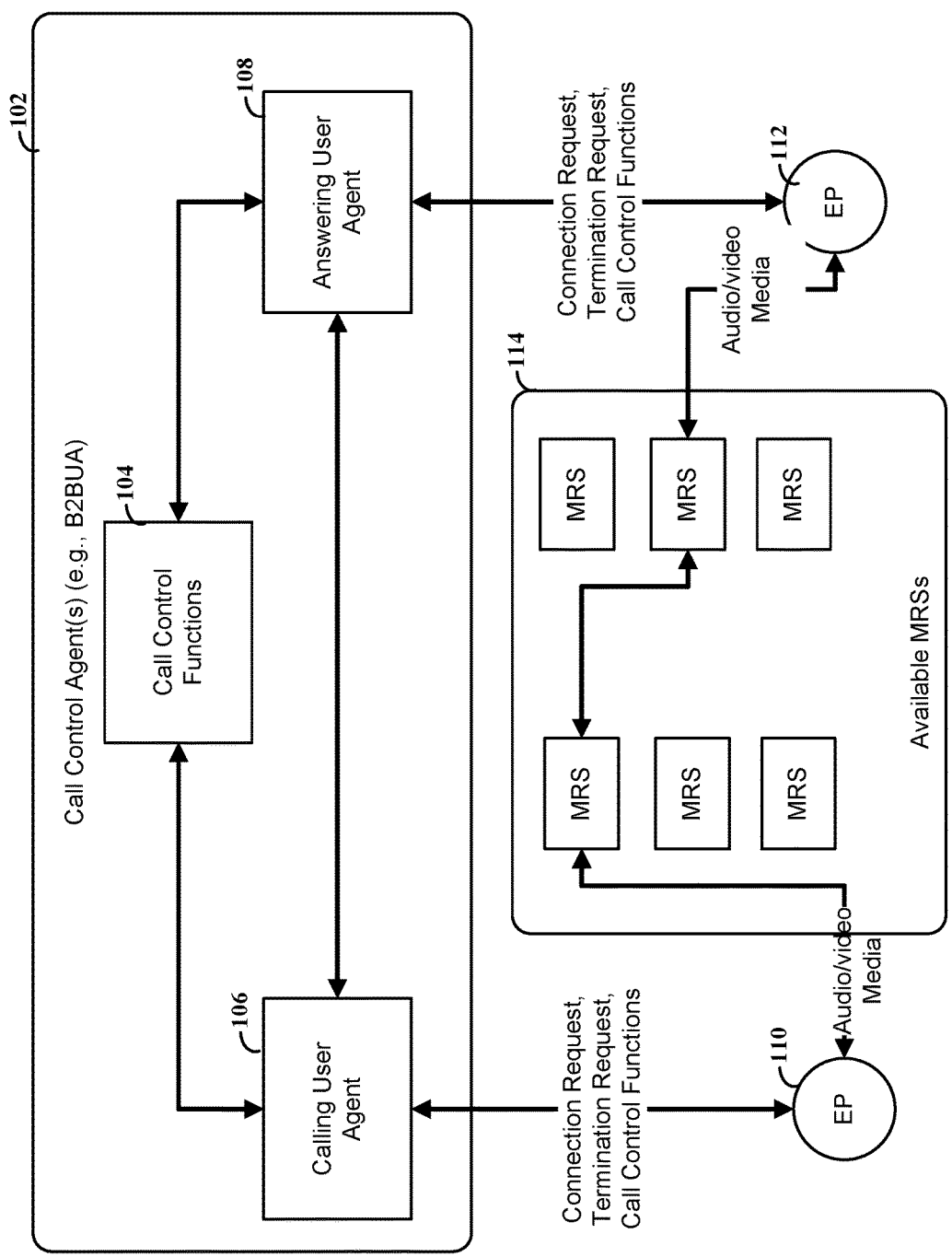
FIG. 1 depicts a system for establishing a call between two endpoint devices by selecting between geographically disparate MRSs, consistent with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements involving disparately located servers, which provide call control and media-relay functionality, respectively. While the present disclosure is not necessarily limited to such applications, various aspects of the disclosure may be appreciated through a discussion of various examples using this context.

Consistent with embodiments of the present disclosure, a user of a VoIP device can initiate or receive a telephone call. The VoIP device can manage the call parameters using an appropriate call control protocol (such as session-initiation-protocol or SIP). The call control signaling communications between the VoIP service provider's equipment and the customer's VoIP device is sent through a call control agent (such as a B2BUA server, an IP-PBX or a Contact Center application), which can also function as a proxy. One purpose of the call control agent is to provide network-address-translation (NAT) traversal services, by providing a mechanism via which all media to and from the user's VoIP device is relayed through a media relay server (MRS). The call control agent uses a MRS control protocol to communicate with the MRS to establish and control the media relay path.

The functionality of the control agent and the MRS can be conceptually thought of as two different logical servers; however, their functions are closely linked with various messages (control, status, etc.) being shared between the two components. As such, the natural configuration and tendency is to ensure that the control agent and MRS are collocated. This collocation can even be to the extent of operating both components on the same physical hardware as two logical servers. This collocation makes a certain amount of sense, as each call will use both the control agent and the MRS.

Aspects of the present disclosure recognize that collocation of the control agent and MRS is not always desirable and further identifies problems with collocation that are not readily apparent. Based upon these and other recognitions, embodiments of the present disclosure provide solutions that allow the functions of the call control agent and MRS to reside in different physical locations (e.g., datacenters), even to the extent that they can be located in disparate locations around the globe. It is also recognized that the physical location can be relevant to more than just the distance between two communicating devices. The logical connections and transmission/media path between the devices can vary significantly even when the physical distances are relatively equal.

A particular recognition is that the transmission/media path for the call signaling (e.g., SIP) flow is less critical in terms of parameters associated with physical location. For instance, the latency of the media path, the variability of the latency (jitter) and the potential for dropped packets are each a factor that generally will have less stringent demands for the call control agent than for the MRS. This realization suggests that servers providing call control agent functionality can be located substantially independent of their physical location, e.g., nearly anywhere in the world.

Other recognitions relate to the communications between a call control agent and an MRS. Somewhat surprisingly, such communications between the call control agent and MRS will also generally have less stringent demands. This recognition helps to establish the unexpected realization that constraints on the MRS can generally be considered independently from constraints on the call control agent.

Various aspects and embodiments of the present disclosure recognize the importance of selecting an MRS based upon the effect of the selected MRS on real-time media flow on the IP network. Accordingly, an MRS can be selected based upon expected characteristics of its media flow path. For instance, this type of selection can be made with the goal of an improved real-time audio/video experience due to the fact there are few dropped packets and/or that the media latency and "jitter" (fluctuations in latency) are low.

Particular embodiments of the present disclosure are directed toward a VoIP system that includes a call control agent server configured and arranged to perform a number of call control functions for VoIP calls. The call control agent is configured to receive a connection request for a VoIP call. Generally, the connection request will include at least a source identifier (identifying the calling party) and a destination identifier (identifying the called party). The call control agent is particularly well suited for use in a system where the media relay functions for a call can be carried out by any of a variety of different MRSs, which can be physically located throughout the world. For instance, the call control agent can be configured to access a list of MRSs that are located at geographically disparate locations relative to one another and to the call control agent. In order to select between the MRS in the list, the call control agent can execute a selection algorithm that processes variables for the MRSs in the list. These variables can take into consideration a variety of different factors, some of which are discussed in more detail herein. Responsive to the algorithm, the call control agent can then select a particular MRS from the list. The call control agent can then route, in response to the selection, voice media for the VoIP call to the particular MRS. This can be accomplished, for example, by providing the calling and/or called VoIP device with identifying information (e.g., an IP address) for the selected/particular MRS. The call control agent then allows the call to proceed while maintaining a call state for the VoIP call with the voice media being routed through the particular MRS during the call.

Certain embodiments of the present disclosure are directed toward configurations of a VoIP system that recognize the scalability advantages that can be realized by decoupling the call control agent from the MRS. For instance, the lower demands on call control agents facilitate the consolidation of call control agent functions into a fewer number of physical call control agent locations and/or physical servers. Moreover, the system can be constructed with more weight given to considerations other than the physical and logical location of the call control agent(s) relative to desired media flow paths. For instance, the presence of existing infrastructure/data centers can present significant cost savings over having to locate a new call control agent somewhere else. This may be particularly useful for expanding capabilities into new markets, countries and locations without the need for the call control agent to be physically located in (or even near) the new location/country.

Various embodiments of the present disclosure are directed toward a system in which different entities (e.g., companies) can offer the call control agent and MRS, respectively. For instance, each entity or company may offer VoIP services with a respective (and potentially proprietary) set of features offered to their customers by way of their call control agent software and configurations. The entities, however, may have an existing MRS infrastructure in place in certain locations, but not others. An entity with an existing MRS infrastructure may have extra call capacity and/or may have a relatively simple path to increase their call capacity. Accordingly, it may be advantageous for one entity to use the MRS infrastructure of another, e.g., rather than start building from the ground up. Aspects of the present disclosure are directed toward such capabilities and toward various components that facilitate such capabilities. For instance, the call control agent can include MRS from other entities as potential call completion options. The selection algorithm can include the respective cost of using these MRS, including, but not limited to, a comparison of costs between entities having different rates for use of their respective MRS. In other instances, a module can be provided that tracks the use of MRS to allow for the entities to calculate billing and/or project future usage.

Consistent with embodiments of the present disclosure, a MRS can be chosen based on some weighted formula according to, but not limited to, one or more of the input parameters discussed herein. One set of input parameters relate to the number of network routing devices ("hops") between various components in the system. A first parameter can include the hops between the customer's VoIP device/client and the datacenter hosting the MRS. Another parameter can include the number of hops between the MRS datacenter and destination of the next known media relay or termination device (which could be another MRS, another VoIP client, or a public switched telephone network (PSTN) gateway). The general goal of this portion of the selection algorithm can be to reduce the number of network routing devices that the media will traverse on the IP network. A further parameter could be the number of hops between the call control agent and one or more of the customer's VoIP devices, the MRS datacenter, next known media relay and the termination device.

Another type of parameter relates to the total of the physical distances between the customer's VoIP device and the MRS datacenter, and the MRS datacenter and the next known media relay or termination device (which could be another MRS, another VoIP client, or a PSTN gateway). For instance, the selection algorithm can use this type of parameter to make a selection that reduces the physical distance between the VoIP client and media destination address.

A further parameter relates to the load on each MRS. For instance, an MRS with a lighter load can be selected before an MRS with a higher load. Various load balancing algorithms can be used to select an MRS. As an example, predictive algorithms can be used to account for future changes in load due to calls being terminated. Thus, expected/average call times can be used to maintain a desired balance by distributing incoming calls to account for expected call lengths in order to avoid large swings in MRS loading due to groups of calls terminating around the same time. In this manner, a MRS could temporarily be given a slightly higher load when a large number of existing calls are expected to be terminated in a short time. The selection algorithm can also attempt to distribute calls between MRSs according to their expected call completion times to reduce the likelihood of large load variances due to calls ending near the same time.

Further parameters can be derived from information relating to the Internet Service Provider (ISP) used by the endpoints/customers. For instance, knowledge of an ISP's routing behavior (e.g., direct peering capabilities) can be used to influence the MRS selection policy.

Consistent with certain embodiments, a system can be configured to consider service levels for a particular user. For instance, a first set of users may subscribe to or use a relatively high cost business service, whereas a second set of users may subscribe to or use a low cost (or even free) personal service. The system can be designed to provide priority to the first set of users. As a non-limiting example, customers may be offered discounted VoIP services in exchange for agreeing to be given a lower priority for access to call-quality related system components, and particularly, to high-quality MRS. This can further facilitate load balancing between MRSs. For instance, lower priority call requests can use an algorithm in which the load balancing is of high priority, but other factors are of lower priority. Higher priority call requests can use an algorithm in which load balancing is given a relative low priority. Thus, the higher priority call requests will generally be assigned to MRSs that are closer to the call origination point. This may result in an uneven distribution of calls between MRSs (e.g., where a call volume is particularly high from a particular location). So long as there are a sufficient number of lower priority call requests, however, the load distribution profile between MRSs can remain relatively balanced.

Additional embodiments of the present disclosure are directed toward a system that is configured and arranged to dynamically switch between MRSs during a call. For instance, the call control agent can detect or determine that a switch to a new MRS is desirable. In response to this determination, the MRS can select a new MRS using an appropriate selection algorithm. In one implementation, the call control agent can then instruct the endpoints to begin a new media stream with the newly selected MRS. The old media stream can be discontinued. In certain implementations, the system allows for two simultaneous media streams to be operating, while the endpoints use only one for final display/presentation to an end user. This can reduce the potential for lost packets/audio/video during the switch. Particular embodiments can establish a separate buffer for each media stream at the endpoints. The endpoints can then monitor the respective buffers to identify when to switch between media streams (e.g., using time stamps to identify when the buffers are relative synchronized).

Turning now to the figures, FIG. 1 depicts a system for establishing a call between two endpoint devices by selecting between geographically disparate MRSs, consistent with embodiments of the present disclosure. Call control agent 102 can be configured and arranged to provide various call control functions 104. At a basic level, the call control functions include call setup and teardown, but the call control functions can include a variety of additional features. Call control agent 102 can operate using SIP. The use of SIP, however, is not required in all embodiments and various other call control protocols can be used. Call control agent 102 can provide both calling user agent 106 and answering user agent 108 for respective endpoints 110 and 112. Thus, call control agent 102 divides a call into two separate legs. Accordingly, certain embodiments are directed toward a call control agent 102 that operates as a B2BUA or an IP-PBX.

When calling endpoint 110 attempts to initiate a call, it sends a call request to call control agent 102. Call control agent then interfaces with the calling endpoint using calling user agent 106. The call control agent can then set up the second leg of the call by establishing answering user agent 108 and attempting to contact answering endpoint 112. As part of the call setup, call control agent 102 is configured and arranged to select from the available MRS 114. FIG. 1 depicts a separate MRS for each of the calling endpoints 110 and the answering endpoint 108; however, a single MRS can be used to carry out a call.

The call control agent 102 can be configured to send instructions to the selected MRS in order to establish the media relay/routing logic between the caller and called parties. The instructions can include the identification of a control protocol. The control protocol can define how, amongst other things, the MRS is to: establish, control, modify and tear down media relay sessions; provide media transcoding and/or encryption/decryption instructions, and/or retrieve media statistics and call quality metrics for a relay session.

Consistent with certain embodiments, an MRS can provide encryption/decryption capabilities for the transmitted audio (video, etc.) media. For example, the call control agent 102 can instruct an MRS to encrypt the transmitted media between the caller and the MRS, but not to encrypt the media from the MRS to the called party, and vice-versa. Other instructions might specify different encryption parameters/methods for either leg of the call flow on either side of the MRS. This can be particularly useful to account for potential differences between the encryption/decryption capabilities of the caller and callee.

The VoIP endpoints can be provided in the form of VoIP soft phones (software running on a computer processor circuit), VoIP hard phones (specially designed hardware phones and circuits) and/or VoIP adapter devices (specially designed hardware that provides an interface between an IP network and a standard public switch telephone network telephone device). Other types of VoIP endpoints are also possible including, but not necessarily limited to, mobile devices/telephones with Internet access.

Embodiments are directed toward such a system in which the call control agent 102 is provided by a computer server. The call control agent (server) 102 can be configured and arranged to perform a number of call related functions. For instance, the call control agent server 102 can be configured and arranged to receive a connection request for a VoIP call initiated by calling endpoint 110. The connection request can include a source identifier (corresponding to calling endpoint 110) and a destination identifier (corresponding to answering endpoint 112). The call control agent server 102 responds to the connection request by accessing a list of MRSs 114. The list includes a number of different MRSs that are located at geographically disparate locations relative to one another, although some of the MRSs can be located within a common location/data center.

The call control agent server 102 can also be configured to execute a selection algorithm that processes variables for the MRSs 114 in the list. In response to the selection algorithm, the call control agent server 102 is configured to select a particular MRS from the list. In response to the selection, the call control agent server 102 can direct an endpoint to route audio media (and also video or other media) for the VoIP call through the particular MRS. The call control agent server 102 can also be configured to maintain a call state for the VoIP call while the voice media is routed through the particular MRS.

Consistent with certain embodiments call control agent server 102 can be configured and arranged to provide call management options to one or more participants in the VoIP call. The call management options can include features such as (but not necessarily limited to): call forwarding or translation to route calls to a particular telephone number to a specific device, hunt groups that allow multiple endpoints to be linked to a single telephone number and further allow for rules to be designed for call routing within the hunt group, call holding or call queuing, caller identification (ID), voice mail, interactive voice responses, fax to email, call recording and others.

Various embodiments of the present disclosure are directed toward MRSs that can be configured to provide a number of functions, and one such function is network-address-translation (NAT) traversal service. This function is based upon the recognition that NAT can interfere with end-to-end connectivity between two endpoints attempting to establish a VoIP call. Embodiments of the present disclosure further recognize that NAT traversal can be accomplished using several different techniques, however, NAT behavior is not standardized and therefore certain techniques may not work with a particular NAT. Accordingly, more particular aspects of the present disclosure are directed toward the selection of an MRS based upon the existence and type of NAT for one or more of the endpoints and the NAT traversal capabilities of the MRSs in the list of MRSs.

Another function of the MRSs relates to the ability to transcode audio/voice/video media. The transcoding provides a gateway/bridge between a source endpoint and a destination endpoint that use different codecs for the VoIP call.

Figure 2:
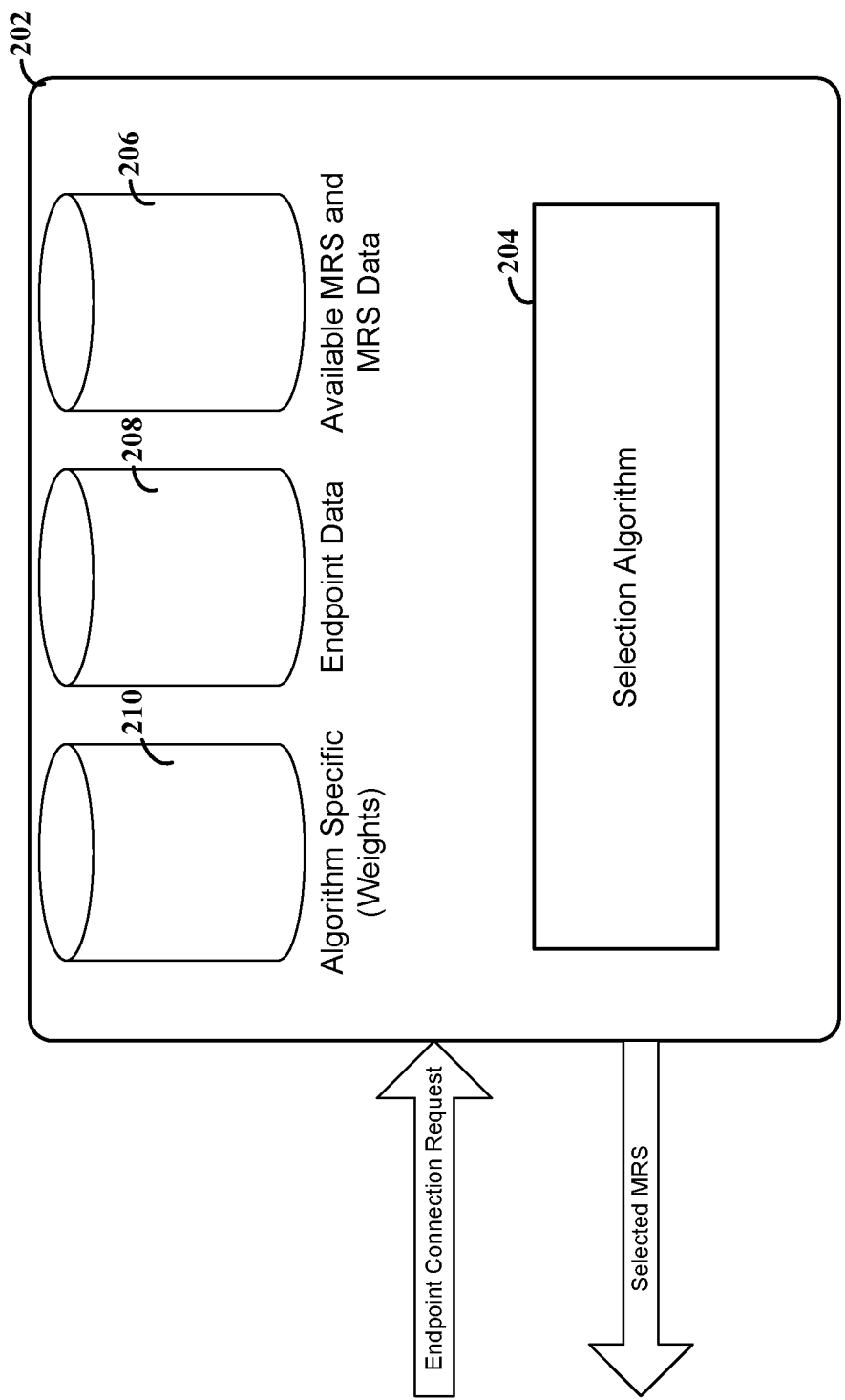
FIG. 2 depicts a block diagram for selecting an MRS based upon a selection algorithm, consistent with embodiments of the present disclosure.

FIG. 2 depicts a block diagram for selecting an MRS based upon a selection algorithm, consistent with embodiments of the present disclosure. Module 202 can be configured and arranged to respond to a call connection request by using selection algorithm 204 to select one or more MRSs to complete the call. As discussed herein, there are a number of different inputs that can be used by the selection algorithm 204. Some of the inputs relate to information relative to the MRS, as shown by database symbol 206. Others of the inputs can relate to information relative to one or more of the endpoints, as shown by database symbol 208. Further inputs can be directly related to the selection algorithm 204 (e.g., different weights applied to different information/factors), as shown by database symbol 210. Other types of useful information do not necessarily fall within one of these categories, but are not excluded from use in the selection algorithm 204. Moreover, the information can be received from external sources (e.g., as part of the connection request or in response to a query from module 202).

A few non-limiting examples of information include one or more of the number of hops between a source VoIP device and each MRS, the number of hops between each MRS and a next known media relay or termination device, the geographic distances between the source VoIP device, each MRS and the next known media relay or termination device, the load of each MRS, and capabilities of an ISP used in the VoIP call.

Embodiments of the present disclosure allow for the selection algorithm to be dynamically updated according to the current operating conditions. For example, call quality data for previous VoIP calls can be provided. This call quality data can be correlated to particular aspects of the related VoIP, e.g., the participating MRSs, the participating endpoints, the participating ISPs and/or the relevant geographic locations of different components. Future calls can then be routed by correlating past call quality with similar aspects of the future calls and then selecting an MRS with expected acceptable call quality.

Various embodiments of the present disclosure relate to the ability for dynamic modifications to be made to the list of available MRSs. The changes can reflect new MRSs being added or removed. They can also reflect MRSs that become available when new agreements are reached between the system operator and entities that provide one or more MRSs.

Further embodiments of the present disclosure are directed toward the use of priority ratings for the VoIP calls. The priority rating can indicate preferential treatment for certain callers so that they are provided access to MRSs with higher call quality before access is provided to callers with a lower priority. The priority can be based upon a number of factors, one of which is the subscription option of the caller. For instance, a caller can subscribe to a premium service or to a discount service and receive different priorities accordingly. In this manner, the priority can be based upon a subscription type that is associated with one or more of the source identifier and the destination identifier for the VoIP call.

Another priority basis could be the source or destination for the call. As an example, the VoIP system can be configured and arranged to provide a high priority rating in response to the destination identifier indicating that the VoIP call is for emergency services.

Certain embodiments recognize that the use of geographically disparate MRSs can sometimes raise issues of compliance with different laws of different countries. Accordingly, the selection algorithm can include acceptable and/or unacceptable MRS locations based upon the applicable laws of a country involved in a particular call.

Figure 3:
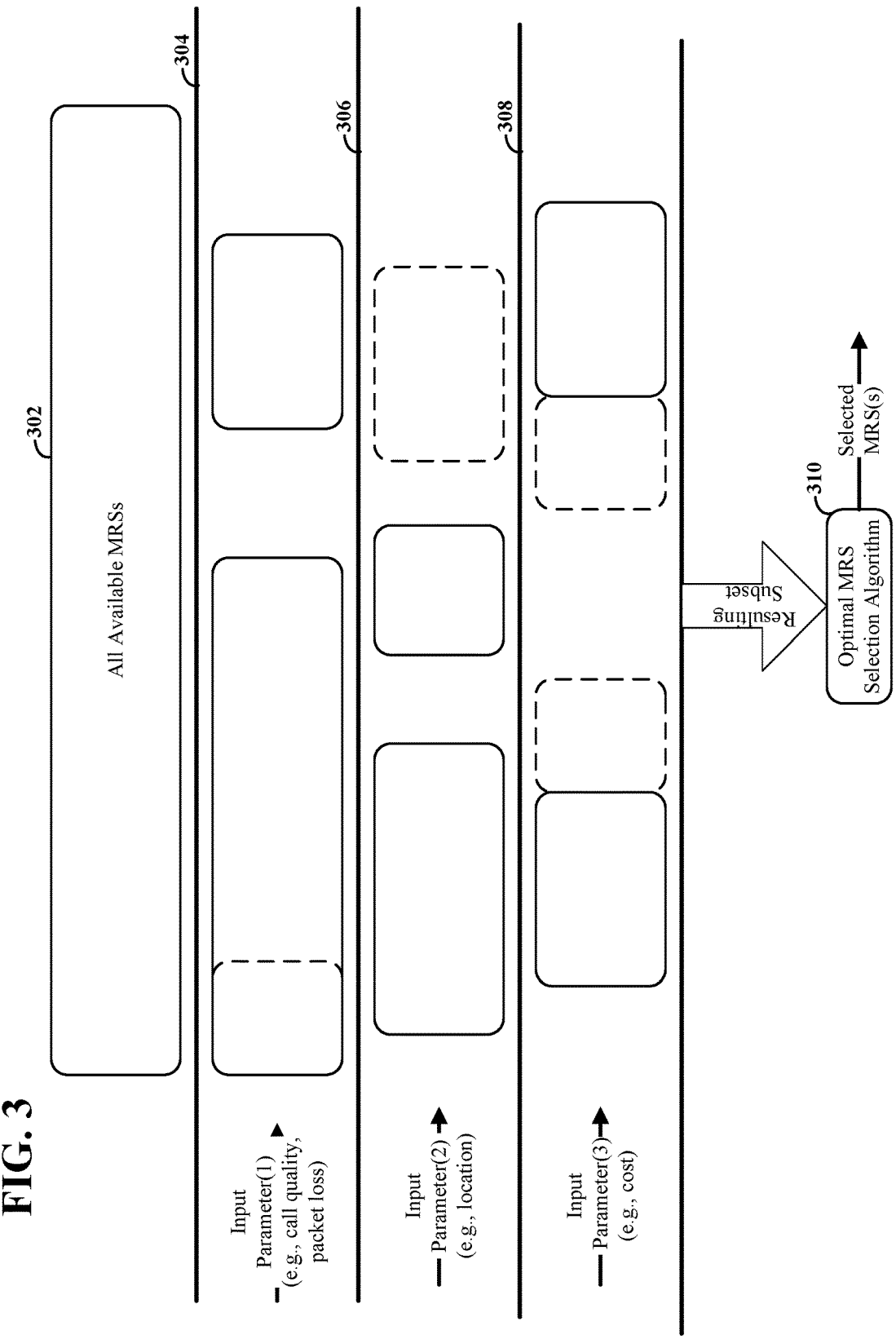
FIG. 3 depicts a block diagram representing aspects of a selection algorithm, consistent with embodiments of the present disclosure.

FIG. 3 depicts a block diagram representing aspects of a selection algorithm, consistent with embodiments of the present disclosure. FIG. 3 shows a set of blocks representing the use of a selection algorithm that first narrows the selection of the total available MRSs 302 to one or more subsets 304-308. Each block within subsets 304-308 represents a portion of the available MRSs 302. Overlapping portions of the different subsets (in the vertical direction) represent MRSs that meet both respective selection criteria and that can be passed onto the optimal selection algorithm 310.

The subsets can be selected by narrowing the available MRSs to those MRSs having an acceptable call quality, and then selects between the narrowed subset using other parameters (e.g., load balancing or cost). Performance metrics for the call quality can include various different factors that affect aspects such as packet loss, jitter and delay. In certain embodiments, the size of the subset can be controlled by an adjustable input parameter that defines the acceptable parameters for the subset. For instance, the input parameter for subset 304 could be based upon a maximum number of hops in the transmission path. The algorithm can also be configured to narrow the selection to a subset 306 based upon geographic location (e.g., where the input parameter specifies a maximum distance) or cost 308 (e.g., where the input parameter specifies a maximum cost for using the MRS). Various other subsets can be used alone or in combination to provide a quick and efficient selection technique.

The size of the subsets can be varied according to the respective input parameters. Accordingly, the dotted portions of the subsets 304-308 represent either an expansion or reduction in the subset size. The size of the subsets can be varied for a variety of reasons, one of which is that the number of MRSs satisfying each of the input parameters may be too high or too low. The subsets can also each be chosen using a combination of input parameters and a simple or complex relationship can be established between the different input parameters.

In certain embodiments, the algorithm can be configured to recognize the interactions between the different parameters. For instance, the latency of an individual packet may be relatively low for a particular transmission route; however, the call quality may still be very poor when there is high packet loss. Thus, the call control agent may select an MRS having a higher latency and a lower packet loss, relative to other MRSs.

Other aspects of the present disclosure utilize the ability of the call control agent to dynamical adjust the operating parameters of the call. For instance, if an MRS is capable of dynamically switching codecs during a call, the call control agent can direct the MRS to change codecs in response to a real time evaluation of the call quality. Moreover, the call control agent can be configured to select an MRS based upon the capability of an MRS to dynamically switch between codecs. For instance, a connection route between the endpoints and first MRS may exhibit a high packet loss but a significantly lower latency. The algorithm can be configured to select the higher packet loss route and switch to a more packet loss tolerant codec like Internet Low Bitrate Codec (ILBC), assuming the first MRS and the endpoints are capable of using such a codec. Other (non-limiting) examples of voice codecs include G.711, G.723, G.726, G.728, and G.729.

Accordingly, various embodiments factor in the ability of an MRS to provide packet loss concealment (PLC), which can mitigate for lost packets. Different codecs provide different mechanisms for PLC, each having different levels of effectiveness. For instance, certain codecs can account for dead time caused by a lost packet by playing a filler sound (e.g., as sound based upon the last received audio sample). Another factor that can be analyzed is packet size/interval which defines the size of media content that is contained within a single packet. Although a larger packet interval can provide certain benefits (e.g., reduce overhead/bandwidth) it can also accentuate call quality problems caused by packet loss.

Human perception places limits on the amount of latency that is acceptable before voice quality degradation becomes noticeable. For instance, an effective latency of less than about 150 ms from when voice is detected by a microphone to when the voice is reproduced by a speaker is generally considered sufficient for telephone communications. The algorithm can therefore be configured to budget for the all elements within the transmission path and not just those elements that are contributing to network delay. One such component is a playout buffer. A playout buffer can be used to store received packets in order to introduce an intentional delay packet to provide a synchronous stream. This can help mitigate variable network delays (jitter) by providing constant delays at the endpoint. In certain embodiments, the call control agent can select an MRS as a function of the playout buffer capabilities and settings. Moreover, the call control agent can instruct one or both endpoints to adjust the size of their playout buffer according to expected delays from the selected MRS. In certain embodiments, the call control agent can determine whether or not the playout buffer is configured to dynamically adjust its buffer size according to the current network conditions and make an MRS selection using this determination.

Embodiments of the present disclosure utilize an MRS selection algorithm that can rank MRSs according to an objective speech quality testing standard. One such standard is Perceptual Evaluation of Speech Quality (PESQ). PESQ (and other potential testing standards) can analyze the transport stream analysis without requiring knowledge of the audio being transmitted. In other instances, a known reference signal can be generated at an endpoint and then the received signal can be compared against the expected/known reference signal. For the former methodology, quality ratings for (combinations of) MRSs, call routes, endpoints and ISPs can be generated from actual usage and also in real time for individual calls. For the latter, the endpoints could be configured to generate the reference signal upon initialization. This reference signal can be routed to multiple MRSs to create a baseline for future selections. Alternative or in addition, the endpoints can generate reference signals at later points in time (e.g., whether randomly, periodically or in response to a prompt from a call control agent). For instance, if a new MRS is added to the list of available MRSs, the call control agent could request that one or more endpoints transmit a reference signal to the new MRS and thereby establish a baseline call quality measurement.

Consistent with various embodiments, the call control agent can select a subset of MRSs to be provided to the user device. The user device can then (randomly or based upon locally-available data) select from the subset. In certain instances, the user device can be configured to locally run a quick test for the MRSs in the subset (e.g., determining delay (packet transit time) for the MRSs) and make a selection from this information. Moreover, the user device could maintain the list for future calls to reduce processing demands on the call control agent. The call control agent could provide a new subset of MRSs on a periodic basis or in response to a request for update from the endpoint.

Various modules and/or other circuit-based building blocks may be implemented to carry out one or more of the operations and activities described herein and/or shown in the figures. In such contexts, a "module" is a circuit that carries out one or more of these or related operations/activities. For example, in certain of the above-discussed embodiments, one or more modules are discrete logic circuits or programmable logic circuits configured and arranged for implementing these operations/activities (as in the circuit modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, such modules can include a combination of a CPU hardware-based circuit and a set of instructions in the form of firmware, including one or more CPU hardware circuits with respective set(s) of instructions.

These and other aspects can be implemented in a number of different manners including, but not limited to, stored executable data, computer processors, programmable logic, hardware circuit logic and combinations thereof. The various embodiments described above are provided by way of illustration only and should not be construed to be limiting. Based upon the above discussion and illustrations, those skilled in the art will readily recognize that various modifications and changes may be made without strictly following the exemplary embodiments and applications illustrated and described herein. For example, the methods, devices, and systems discussed herein may be implemented in connection with connection protocols other than SIP. Some various embodiments may also be implemented using a variety of approaches such as those involving a number of different operating systems and software programs/packages. Such modifications and changes do not depart from the true spirit and scope of the envisioned embodiments, including that set forth in the following claims.

What is claimed is:

1. An apparatus comprising:
a first server, including circuitry, configured for processing VoIP calls in a Voice-over-Internet Protocol (VoIP) system by:
receiving a connection request for a VoIP call, the connection request including a source identifier and a destination identifier and, in response, accessing a list of media-relay servers that are located at geographically disparate locations relative to the first server;
selecting a particular media-relay server from the list based on an assessment of load balancing of, the media-relay servers in the list and an expected call length for a set of current calls routed through the media-relay servers in the list;
routing, in response to the selection, voice media for the VoIP call through the particular media-relay server and distributing the VoIP call along with other incoming calls to account for expected call lengths and for loading variances of the media-relay servers in the list; and
allowing the call to proceed while maintaining, for the VoIP call, a call state for the VoIP call while the voice media is routed through the particular media-relay server.

2. The apparatus of claim 1, wherein the first server is further configured and arranged to select the particular media-relay server from the list based on a number of network routing devices between components in the VoIP system.

3. The apparatus of claim 1, wherein the first server is further configured and arranged to select the particular media-relay server from the list based on an Internet Service Provider (ISP) used by one or more endpoint devices.

4. The apparatus of claim 1, wherein the first server is further configured and arranged to configure the media-relay servers in the list to transcode the voice media to bridge between different codecs of a source and a destination for the VoIP call.

5. The apparatus of claim 1, wherein the first server is further configured and arranged to select the particular media-relay server from the list based upon call quality data for previous VoIP calls.

6. The apparatus of claim 1, wherein the first server is further configured and arranged to switch from the particular media-relay server to another media-relay server from the list during the VoIP call.

7. The apparatus of claim 1, wherein the first server is further configured and arranged to select the particular media-relay server from the list based upon a priority rating for the VoIP call.

8. The apparatus of claim 7, wherein the first server is configured and arranged to determine the priority rating in response to the destination identifier indicating that the VoIP call is for emergency services.

9. The apparatus of claim 1, wherein the first server is configured and arranged to direct the particular media-relay server to change codecs during the VoIP call in response to an evaluation of a call quality of the VoIP call.

10. A method comprising:
providing a first server, configured to process Voice-over-Internet Protocol (VoIP) calls and including circuitry, in a VoIP system;
receiving at the first server a connection request for a VoIP call, the connection request including a source identifier and a destination identifier;
accessing at the first server a list of media-relay servers that are located at geographically disparate locations relative to the first server;
selecting a particular media-relay server from the list based on an assessment of load balancing of the media-relay servers in the list and an expected call length for a set of current calls routed through the media-relay servers in the list;
routing, in response to the selection, voice media for the VoIP call through the particular media-relay server and distributing the VoIP call along with other incoming calls to account for expected call lengths and for loading variances of the media-relay servers in the list; and allowing the call to proceed while maintaining, for the VoIP call, a call state for the VoIP call while the voice media is routed through the particular media-relay server.

11. The method of claim 10, wherein selecting the particular media-relay server from the list further includes assessing a number of network routing devices between components in the VoIP system including a number of hops between at least one endpoint device and data center hosting the media-relay servers from the list.

12. The method of claim 10, wherein maintaining a call state further includes providing call management options for controlling the VoIP call relative to at least one endpoint device, which includes circuitry configured for processing VoIP calls.

13. The method of claim 10, wherein the first server is configured and arranged to operate as a proxy with two independent call control protocols on each of a plurality of legs of the VoIP call.

14. The method of claim 10, wherein selecting the particular media-relay server from the list further includes assessing a physical distance between one or more endpoint devices and data centers hosting the media-relay servers from the list.

15. The method of claim 10, wherein selecting the particular media-relay server from the list further includes using a priority rating for the VoIP call as a factor in the selection, wherein the priority rating corresponds with a subscription type that is associated with at least one of the source identifier and the destination identifier.

* * * * *